United States Patent [19]

Sarra

[11] Patent Number: 5,053,762
[45] Date of Patent: Oct. 1, 1991

[54] PAGE TURN SIMULATOR

[75] Inventor: Gene R. Sarra, New Britain, Conn.

[73] Assignee: Microtime, Inc., Bloomfield, Conn.

[21] Appl. No.: 345,082

[22] Filed: Apr. 28, 1989

[51] Int. Cl.[5] .............................................. G09G 5/14
[52] U.S. Cl. .................................... 340/734; 340/721; 340/723; 358/183; 358/22 PIP
[58] Field of Search ............... 340/721, 734, 723, 747; 358/182, 183, 22, 22 PIP

[56] References Cited

U.S. PATENT DOCUMENTS

| 3,821,468 | 6/1974 | Busch . |
| 3,944,731 | 3/1976 | Busch . |
| 3,958,232 | 5/1976 | Hobrough et al. . |
| 3,962,536 | 6/1976 | Busch . |
| 4,183,061 | 1/1980 | Miyake . |
| 4,185,300 | 1/1980 | Miyake et al. . |
| 4,204,227 | 5/1980 | Gurley . |
| 4,520,398 | 5/1985 | Takahashi . |
| 4,560,910 | 12/1985 | Midland . |
| 4,563,703 | 1/1986 | Taylor et al. . |
| 4,591,913 | 5/1986 | Pohl . |
| 4,605,967 | 8/1986 | Pires . |
| 4,611,151 | 9/1986 | Hoover et al. . |
| 4,622,588 | 11/1986 | Chapuis et al. . |
| 4,667,236 | 5/1987 | Dresdner . |
| 4,700,228 | 10/1987 | Heerah . |
| 4,700,232 | 10/1987 | Abt et al. . |
| 4,709,393 | 11/1987 | Taylor et al. . |
| 4,752,828 | 6/1988 | Chapuis et al. . |
| 4,764,809 | 8/1988 | Haycock et al. . |
| 4,779,135 | 10/1988 | Judd . |
| 4,780,763 | 10/1988 | McFetridge et al. . |
| 4,782,384 | 11/1988 | Tucker et al. . |
| 4,782,392 | 11/1988 | Haycock et al. . |
| 4,790,028 | 12/1988 | Ramage . |
| 4,791,489 | 12/1988 | Polatnick . |
| 4,805,022 | 2/1989 | Abt . |
| 4,809,072 | 2/1989 | Pohl . |
| 4,823,183 | 4/1989 | Jackson et al. . |
| 4,860,217 | 8/1989 | Sasaki et al. ......................... 340/723 |

Primary Examiner—Jeffery A. Brier
Attorney, Agent, or Firm—Woodard, Emhardt, Naughton, Moriarty & McNett

[57] ABSTRACT

An apparatus and method for simulating a partially turned page on a video screen using a combination of linear and nonlinear picture partitioning. Multiple variable boundary lines are defined for separating areas on the television screen in which different video signals are displayed representative of the front and back sides of a partially turned page. Circuitry is provided for switching between the video signal for the page being turned and a single-color signal depicting the back of the page being turned, as well as for selecting between a video signal for the page being turned and a video signal for the page being revealed. Additional circuitry is provided for simulating a warp in an image on a page due to the page being turned.

10 Claims, 6 Drawing Sheets

PARAMETER LOCATION
WITHIN THE GROUP OF 16

| GROUP OF 16 ADDRESS | DATA |
|---|---|
| 0 | ZERO (INITIALIZATION) |
| 1 | NUMERICAL VALUE OF C1 FIELD DIVIDER |
| 2 | NUMERICAL VALUE OF C2 FIELD DIVIDER |
| 3 | NUMERICAL VALUE OF C3 FIELD DIVIDER |
| 4 | NUMERICAL VALUE OF C4 FIELD DIVIDER |
| 5 | NUMERICAL VALUE, $K_1$, OF PARABOLA $h_1$ MULTIPLIER |
| 6 | NUMERICAL VALUE, $h_{A1}$, OF PARABOLA $h_1$ OFFSET |
| 7 | NEGATIVE NUMERICAL VALUE, $-VA1$, OF PARABOLA $h_1$ OFFSET |
| 8 | NUMERICAL VALUE, $K2$, OF PARABOLA $h_2$ MULTIPLIER |
| 9 | NUMERICAL VALUE, $h_{A2}$, OF PARABOLAS $h_2$ & $h_3$ OFFSET |
| 10 | NEGATIVE NUMERICAL VALUE, $-VA2$, OF PARABOLAS $h_2$ & $h_3$ OFFSET |
| 11 | NUMERICAL VALUE, $K3$, OF PARABOLA $h_3$ MULTIPLIER |
| 12 | NUMERICAL VALUE, $K4$, OF SLOPE OF LINE $h_4$ |
| 13 | NUMERICAL VALUE, $h_4$ OFF, OF OFFSET OF LINE $h_4$ |
| 14 | ZERO (INITIALIZATION) |
| 15 | NOT ACCESSED |

Fig. 5

PAGE TURN SIMULATOR

BACKGROUND OF THE INVENTION

This invention relates to video systems, and more particularly to video systems and methods for producing special effects.

There is a continuing need in the television broadcasting industry for more sophisticated video processing equipment, including applications in video graphics and special effects among others. Known features today include picture within picture, pan and zoom, picture rotation and inversion, and selective distortion.

SUMMARY OF THE INVENTION

The present invention provides a particularly appealing special effect in the form of a page turn simulator. More specifically, the present invention provides an apparatus and method for simulating a partially turned page on a video screen using a combination of linear and nonlinear picture partitioning. Multiple variable boundary lines are defined for separating areas on the television screen in which different video signals are displayed representative of the front and back sides of a partially turned page.

It is a general object of this invention to provide an improved video processing system and method.

Another object is to provide an improved system and method for producing special effects.

Another object of the invention is to provide means for creating realistic special effects with high visual appeal.

These and other objects of the present invention will be more apparent from the following detailed description of the preferred embodiment taken in conjunction with the accompanying drawings.

BRIEF DESCRIPTION OF THE DRAWINGS

FIG. 5 shows the breakdown of minor addresses according to their respective parameters in the preferred embodiment of the present invention.

DESCRIPTION OF THE PREFERRED EMBODIMENT

Figure 1:
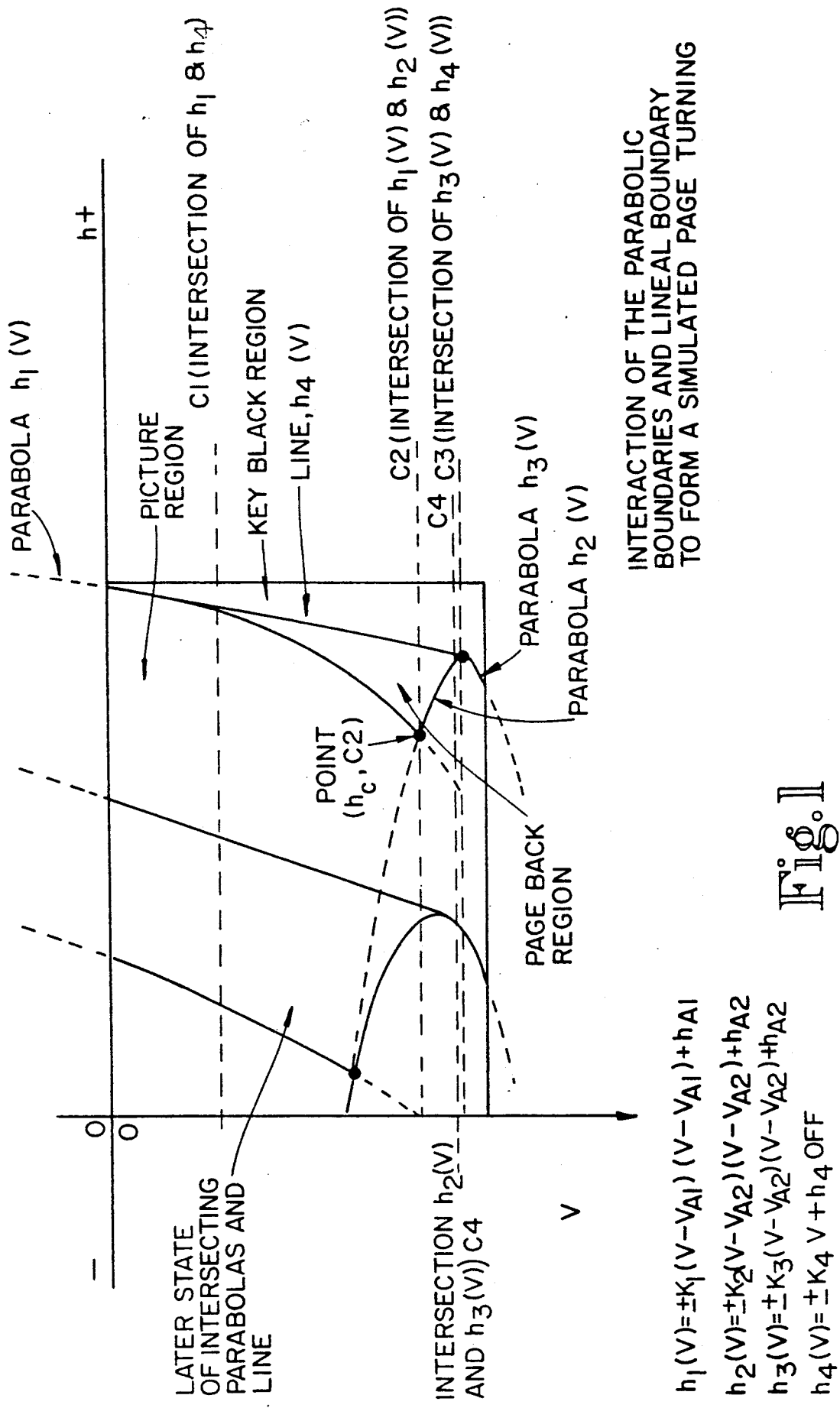
FIG. 1 is a diagram illustrating the interaction of parabolic and lineal boundaries in the preferred embodiment of the present invention at various stages in the simulation of a page being turned.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

With reference to FIG. 1, the preferred embodiment of the page turn simulator according to the present invention operates with three parabolic boundaries and one straight boundary line to define the lateral edges and the fold of a page in the process of being turned. The four boundary lines are labeled on the drawing and are defined according to the following equations:

$$h_1(V) = \pm K_1(V - V_{A1})^2 + h_{A1}$$

$$h_2(V) = \pm K_2(V - V_{A2})^2 + h_{A2}$$

$$h_3(V) = \pm K_3(V - V_{A2})^2 + h_{A2}$$

$$h_4(V) = \pm K_4 V + h_{4off}$$

The above equations are written in terms of variables h (horizontal) and V (vertical) of a Cartesian coordinate system representing the television picture screen. The coefficients and offset values of the above equations are selected so as to produce a set of four intersecting boundary lines for one state or stage of the simulation of the page being turned. Any point (h, V) can be located relative to the origin at the upper lefthand corner of the screen by using counters synchronized to the television scanning system. The location of a succession of related points is achieved by arithmetic operations on each scan line. There are 512 such states in the preferred embodiment, and therefore 512 sets of the parameters defining the above equations. Further, the invention provides for selection of any one of four directions of page turn, each one beginning at a different corner of the page being turned, FIG. 1 representing a leftward turn beginning from the lower righthand corner. There are 512 sets of the above equations for each of the four directions of turn.

By further defining changeover points C1, C2, C3 and C4 in the vertical direction, the system needs to make at most one parabolic and one linear computation per television scan line. Point C1 is the intersection of the $h_1$ and $h_4$ curves. C2 is the intersection of the $h_1$ and $h_2$ curves. C4 is the intersection of the $h_2$ and $h_3$ curves, and C3 is the intersection of the $h_3$ and $h_4$ curves.

The offsets and multiplier coefficients for the line and parabolas can be varied to force the intersection of the curve to achieve the desired shape representing the bending of the page to reveal a simulated backside of the page. The variables can be changed to move the intersecting points in a path which increases the area of the "backside" giving the illusion of a page turn in process. The variables can be changed as frequently as every 1/60th of a second, i.e., once for every field of the picture. The area within the boundaries formed by the intersecting curves is preferably filled with a single color signal to distinguish it from the "front side" of the page being turned. The area outside of the boundaries and not part of the page being turned is used for display of some other video signal representative of an image on a new page being revealed. The illusion of a page being revealed is achieved by first forcing the actual picture signal in this region to be "blacker than black," i.e., a signal level which does not exist in the video shown on the page being turned, then generating another signal called a key signal wherever "blacker than black" exists, and in turn using the key signal to electronically switch over to another picture signal which represents data on the page being revealed.

Figure 3A:
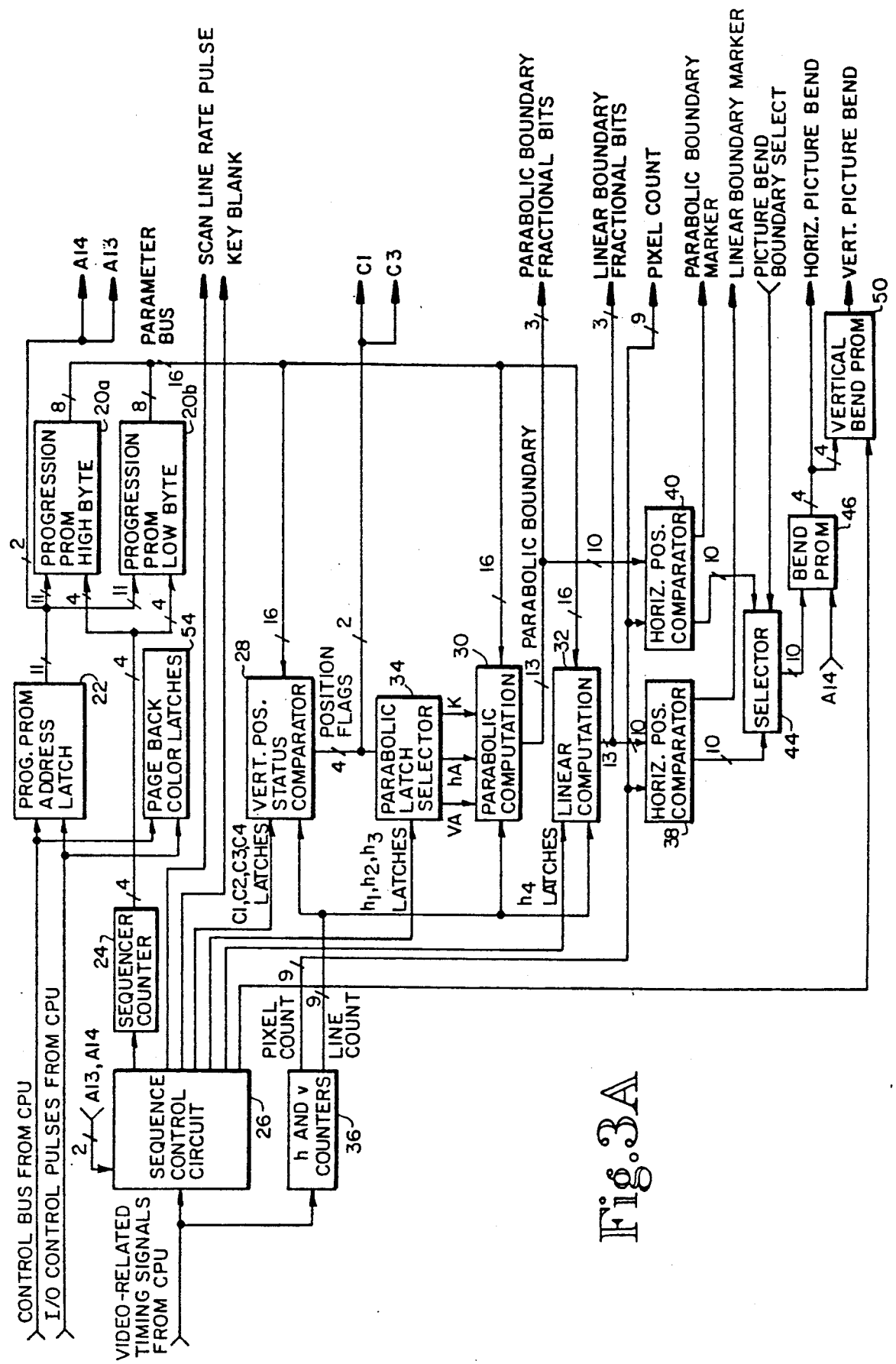
FIGS. 3A and 3B together constitute an overall block diagram of the preferred embodiment of the page turn simulator according to the present invention.
Figure 4:
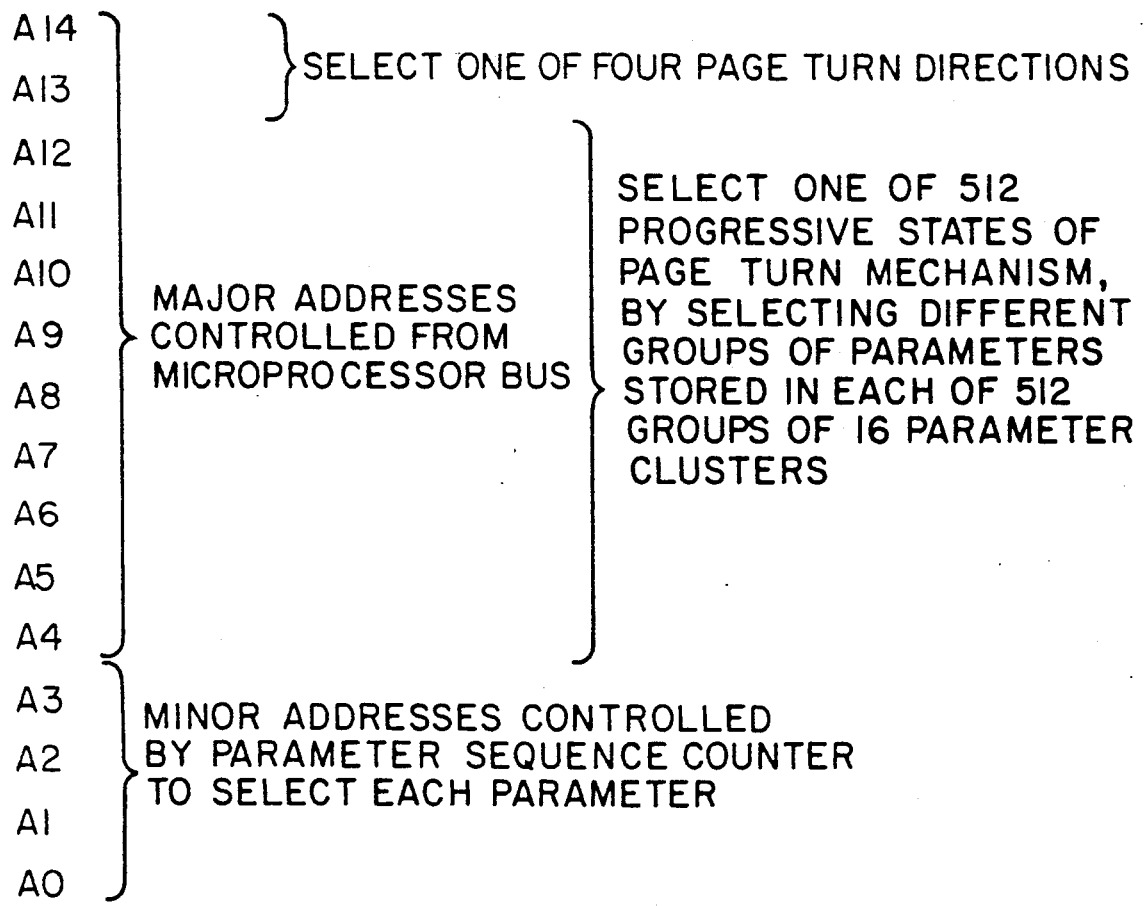
FIG. 4 shows the progression PROM addressing scheme employed in the preferred embodiment of the present invention.

With reference to FIG. 3A, the parameters for the four boundary equations for all 512 states of the progression of a turning page across the screen and for all four directions of turning are stored in progression PROMs 20a and 20b which are sequentially addressed by a host microprocessor (not shown) via the control bus from the CPU and the progression PROM address latch 22. A desired address for progression PROM 20 is latched in at appropriate times under the control of I/0 control pulses from the CPU. The complete address for progression PROM 20 consists of a major address of 11 bits supplied from latch 22 and a minor address of four bits (the least four significant address bits for the PROM) from sequencer counter 24. The progression PROM addressing scheme is shown in more detail in FIG. 4, and the breakdown of the 16 minor addresses according to their respective parameters is shown in FIG. 5. Each parameter is preferably a 16-bit value, the most eight significant bits (high byte) of which are stored in PROM 20a and the eight least significant bits (low byte) of which are stored in PROM 20b. Thus, each 256K (32K by 8) PROM stores half of the data for each of 16 parameters in each of 512 sets of parameters for each of four turning directions.

Sequence control circuit 26 receives video-related timing signals from the CPU and uses them to control the address sequencing of PROM 20 as well as the generation of latch pulses to enable loading of parameter data from PROM 20 via the parameter bus into parameter latches in vertical position status comparator 28, parabolic computation circuit 30, and linear computation circuit 32. The loading of data into computation circuit 30 is controlled through latch-selector circuit 34.

Figure 3B:
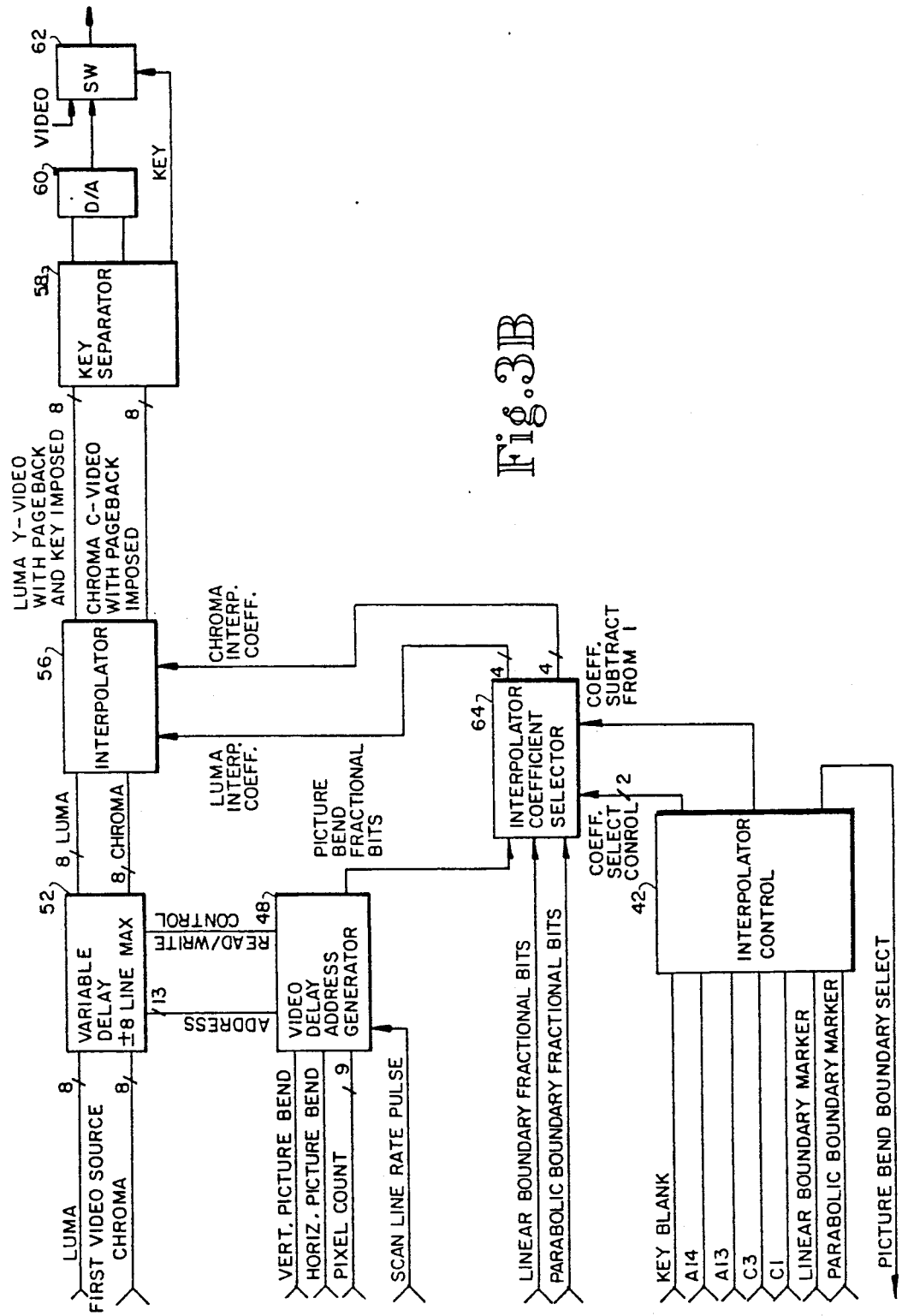

New parameter values are read out of progression PROM 20 for each state of the page turn, and then, under control of the line count supplied by h and V counter circuit 36, comparator 28 determines the vertical position with respect to C1 through C4, and computation circuits 30 and 32 calculate intersection points on the particular line for the respective parabolic and linear boundaries defined by the parameters stored therein for the current state. Those intersection points are compared with their current horizontal position, as represented by the pixel count from h and V counter circuit 36, in horizontal position comparators 38 and 40. When the pixel count matches the boundary points supplied from computation circuits 30 and 32, respectively, comparators 40 and 38 generate respective parabolic and linear boundary markers which are supplied to interpolator control circuit 42 shown in FIG. 3B.

Comparators 38 and 40 each also supply a value to selector circuit 44 which selects one of the values under control of the picture bend boundary select signal from interpolator control circuit 42. The selected value is supplied to a bend PROM 46 which, in response to the received value and also under control of the A14 signal, supplies a horizontal picture bend value to video delay address generator 48 in FIG. 3B and also to vertical bend PROM 50 the output of which is also connected to video delay address generator 48. The vertical picture bend signal is a function of the horizontal picture bend signal and a signal from sequence control circuit 26.

The major address is updated once every television field, and the minor addresses are polled once at the beginning of every scan line during the horizontal blanking interval (63.55 microsecond period). The minor addresses are generated by local 4-bit start/stop parameter sequence counter 24, the count of which (0 to 15) is initiated by a reset trigger and clock pulse train. The counter is timed to stop at each minor address long enough for the data in the progression PROMs to be latched into the appropriate location.

C1 through C4 represent field division lines. Starting with C1, each value is compared to the current line count, and the results are used to determine which of the three sets of parabolic parameters is to be loaded into the arithmetic multipliers and adders in parabolic computation circuit 30. If the values for $h_1(V)$ are to be used on a particular scan line, three latching pulses will be generated, coincident with each address time, by the sequencer counter. These latch pulses allow the data on the parameter bus to be loaded into appropriate multiplier input ports and/or adder points in order that the parabola value, for the current value of V, line count, will be computed. The result of the computation is then latched for use later in the scan line interval as a boundary value for that scan line. Similarly, if the values for parabola $h_2(V)$ are to be used on a particular scan line, three latching pulses will be generated, coincident with each address time, by the sequencer counter. These pulses load the three parameters into the appropriate arithmetic components for computing the parabolic value. The only difference between parameters $h_2(V)$ and $h_3(V)$ is the width coefficient K. In other words, parabola $h_3(V)$ is shaped differently from but positioned identically with $h_2(V)$. Thus, for computation based on the equation for a parabola $h_3(V)$, a latch pulse is only needed to latch in $K_3$ as a replacement value for $K_2$. For the turning directions shown in FIG. 1, C3 is below C4. The reason for this is that $h_4(V)$ is preferably tangential to parabola $h_3(V)$, and, for this to occur with a line slope as shown, the point of intersection must be below the common vertex of the parabolas $h_2(V)$ and $h_3(V)$.

Figure 2:
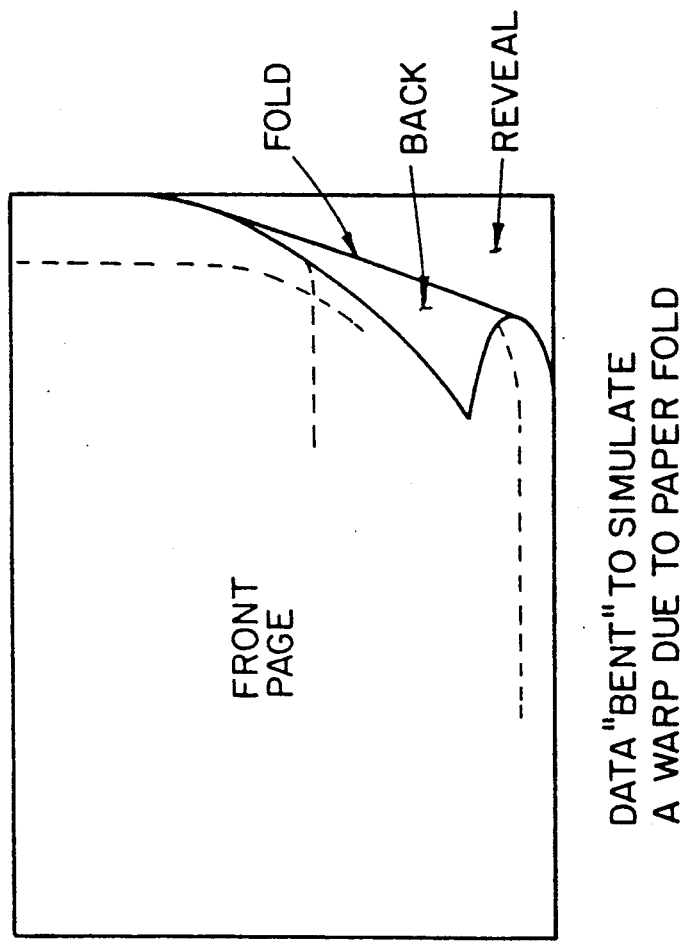
FIG. 2 is a diagram illustrating a simulation of a warp in the image near the paper fold of a page being turned.

For each scan line value V, a point somewhere along the scan line is computed as a boundary value which will alter the video signal to represent the "back of the page," "front of the page," or a key value which selects the page being revealed. The boundary which initiates the key may be a linear or parabolic boundary, depending on the position of the scan line relative to the field division lines C1 and C3. At this boundary which also represents the "fold" in the page, the data on the "front" of the page is made to bend an amount dependent on its distance from the fold. The closer to the fold, the more data is bent in a direction consistent with the direction of the fold, as shown in FIG. 2. The data bending is achieved by varying the video delay through a first-in, first-out (FIFO) variable delay 52 constructed with static random access memory (SRAM) devices. The pixel count is compared to the fold boundary on each scan line, and, as the differential changes, the addressing of the FIFO is altered to change the video delay in both the horizontal and vertical directions causing the picture detail to bend varying amounts and thereby simulate the normal image warp which occurs when a page is turned.

Also shown in FIG. 3A is a page-back, color-latch circuit 54. Color information for the back of the page being turned is loaded into this latch circuit from the CPU under control of pulses on the I/0 control pulse line. This information is used by interpolator 56 (FIG. 3B) in place of the normal video for the page being turned in the region between the two pertinent boundary lines on the line currently being scanned. Luma and chroma signals for the page being turned are supplied from a first video source to variable delay 52 and there-from, after a delay, to interpolator 56 which supplies the delayed luma and chroma signals on its output lines for the visible portions of the front page of the page being turned, supplies the single color signal (page back) for the portion of each scan line between the pertinent boundary lines, and, for the page being revealed, substitutes a "blacker than black" signal level for the delayed luma signal. The "blacker than black" signal imposed on the luma signal is detected by key separator 58 which supplies the luma and chroma signals to D/A converter 60 for conversion to an analog composite video signal which is then supplied to a switch 62 along with the key signal from key separator 58. A second composite video signal is supplied to switch 62 from a reference video source, which represents the page being revealed, and switch 62 operates under control of the key signal to switch from one composite video signal to another to selectively output either the page being turned or the back thereof, or the page revealed.

Computation circuits 30 and 32 also supply bits corresponding to a fractional pixel count to an interpolator coefficient selector 64 to enable switching among video sources at fractional pixel locations. Coefficient selector 64 also receives a picture bend fractional bits input from video delay address generator 48.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A method of simulating a page turning effect on a video screen having multiple scan lines, comprising the steps:
   (a) defining in memory a plurality of sets of boundary lines, each set being representative of a different stage of progression of a turning page and including
      (1) a first parabolic boundary line representative of a two-dimensional image of a partially turned lateral edge of said turning page;
      (2) a second parabolic boundary line representative of a two-dimensional image of a partially turned top or bottom edge of said turning page; and
      (3) a third boundary line representative of a fold of said turning page;
   (b) reading said sets of boundary lines out of memory in succession;
   (c) selecting among the first, second and third boundary lines of each set read from memory for each of a plurality of said scan lines on said video screen;
   (d) calculating the intersection point of each selected boundary line on each scan line for which it is selected; and
   (e) switching between first and second video sources in synchronism with line scanning, said synchronized switching step including, for each set of boundary liens read from memory, comparing current position on each particular scan line being scanned with each intersection point calculated for said particular scan line;
   wherein said selecting step includes selecting said first and third boundary lines for a first subset of said plurality of scan lines and selecting said second and third boundary lines for a second subset of said plurality of said scan lines; and
   wherein said switching step includes switching to said second video source for the portion of each of said plurality of scan lines located between the boundary lines in either of the pairs of boundary lines selected in said selecting step, whereby an image from said second video source is displayed on said video screen between said partially turned lateral edge, said partially turned top or bottom edge and said fold of said turning page so as to simulate an image on the back of said turning page.

2. The method of claim 1 further comprising the step of switching between said second video source and a third video source, in synchronism with line scanning, at the intersection point of said third boundary lien on each of said plurality of said scan lines on said video screen, thereby simulating a page partially revealed behind said turning page.

3. The method of claim 2 further comprising the step of selecting only said second parabolic boundary line for a third subset of said plurality of scan lines on said video screen;
   wherein said switching step includes switching directly between said first and third video sources at each intersection point of said second parabolic boundary line on each scan line in said third subset of said plurality of said scan lines on said video screen, thereby simulating a direct transition between the front of said turning page and the page partially revealed behind said turning page at a portion of said partially turned top or bottom edge.

4. The method of claim 3 wherein said second parabolic boundary line is defined by two parabolas having a common vertex but different width coefficients, wherein one of said parabolas is representative of a two-dimensional image of said portion of said partially turned top or bottom edge and the other parabola is representative of a two-dimensional image of the remainder of said partially turned top or bottom edge of said turning page.

5. The method of claim 4 further comprising the step of warping video data to simulate a warped image near said fold on said turning page.

6. A page turn simulator for simulating a page turning effect on a video screen having multiple scan lines, comprising:
   (a) means for defining in memory a plurality of sets of boundary lines, each set being representative of a different stage of progression of a turning page and including
      (1) a first parabolic boundary line representative of a two-dimensional image of a partially turned lateral edge of said turning page;
      (2) a second parabolic boundary line representative of a two-dimensional image of a partially turned top or bottom edge of said turning page; and
      (3) a third boundary line representative of a fold of said turning page;
   (b) means for reading said sets of boundary lines out of memory in succession;
   (c) means for selecting among the first, second and third boundary lines of each set read form memory for each of a plurality of said scan lines on said video screen;
   (d) means for calculating the intersection point of each selected boundary line on each scan line for which it is selected; and (e) means for switching between first and second video sources in synchronism with line scanning, said synchronized switching means including means operative for each set of boundary lines read from memory for comparing current position on each particular scan line being scanned with each intersection point calculated for said particular scan line;

wherein said selecting means includes means for selecting said first and third boundary lines for a first subset of said plurality of scan lines and selecting said second and third boundary lines for a second subset of said plurality of said scan lines; and wherein said switching means includes means for switching to said second video source for the portion of each of said plurality of scan lines located between the boundary lines in either of the pairs of boundary lines selected by said selecting means, whereby an image from said second video source is displayed on said video screen between said partially turned lateral edge, said partially turned top or bottom edge and said fold of said turning page so as to simulate an image on the back of said turing page.

7. The page turn simulator of claim 6 further comprising means for switching between said second video source and a third video source, in synchronism with line scanning, at the intersection point of said third boundary line on each of said plurality of said scan lines on said video screen, thereby simulating a page partially revealed behind said turning page.

8. The page turn simulator of claim 7 further comprising means for selecting only said second parabolic boundary line for a third subset of said plurality of scan lines on said video screen;

wherein said switching means includes means for switching directly between said first and third video sources at each intersection point of said second parabolic boundary line on each scan line in said third subset of said plurality of said scan lines on said video screen, thereby simulating a direct transition between the front of said turning page and the page partially revealed behind said turning page at a portion of said partially tuined top or bottom edge.

9. The page turn simulator of claim 8 wherein said second parabolic boundary line is defined by two parabolas having a common vertex but different width coefficients, wherein one of said parabolas is representative of a two-dimensional image of said portion of said partially turned top or bottom edge and the other parabola is representative of a two-dimensional image of the remainder of said partially turned top or bottom edge of said turning page.

10. The page turn simulator of claim 9 further comprising means for warping video data to simulate a warped image near said fold on said turning page.

* * * * *